Aug. 14, 1945.  A. M. YOUNG  2,382,460
AIRCRAFT
Filed Jan. 8, 1941  6 Sheets-Sheet 1

INVENTOR.
Arthur M. Young

Aug. 14, 1945. A. M. YOUNG 2,382,460
AIRCRAFT
Filed Jan. 8, 1941 6 Sheets-Sheet 3

INVENTOR.
Arthur M. Young

Aug. 14, 1945. A. M. YOUNG 2,382,460
AIRCRAFT
Filed Jan. 8, 1941 6 Sheets-Sheet 4

INVENTOR.
Arthur M. Young

Aug. 14, 1945.          A. M. YOUNG                2,382,460
                         AIRCRAFT
                    Filed Jan. 8, 1941         6 Sheets-Sheet 5
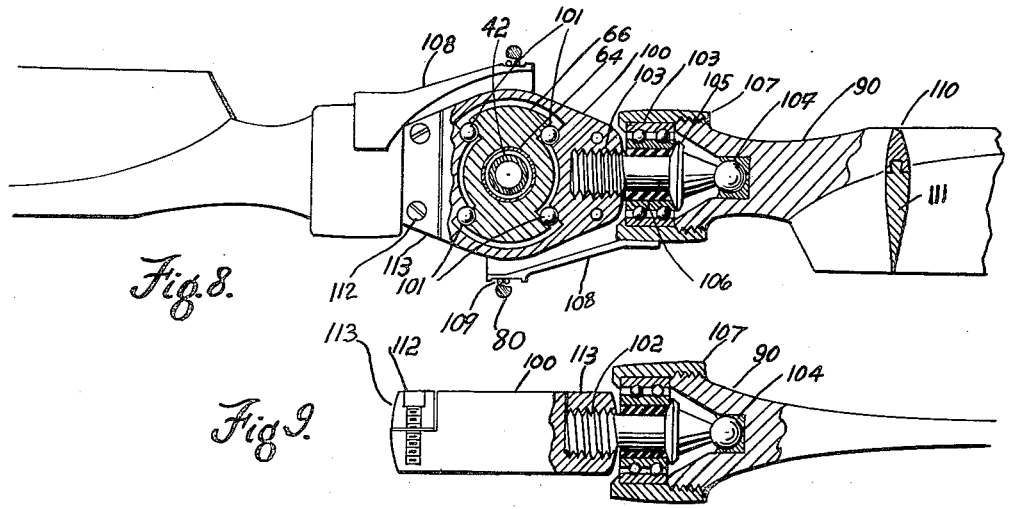
Fig. 8.
Fig. 9.
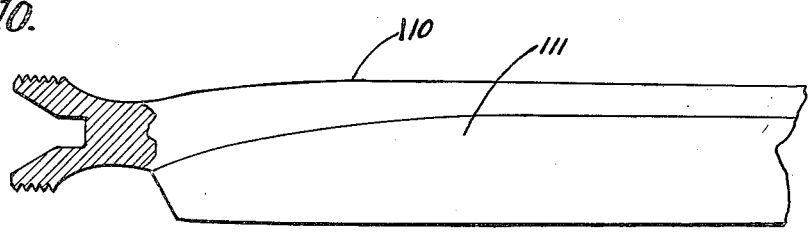
Fig. 10.
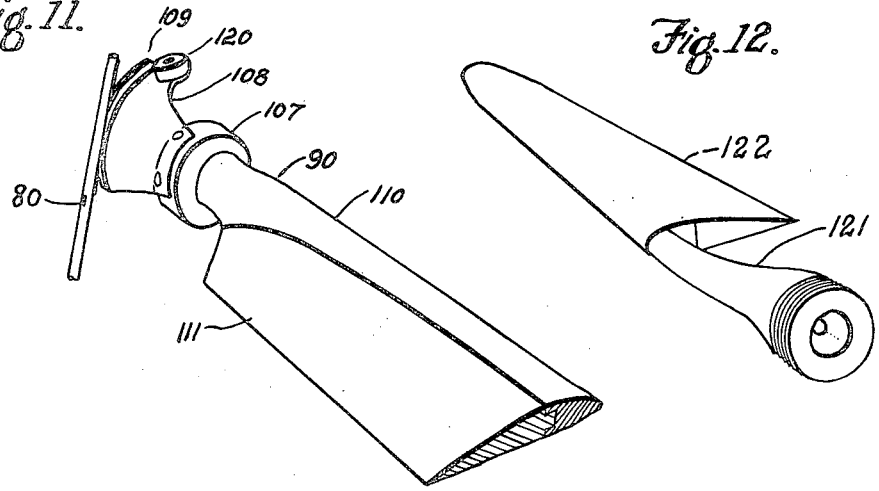
Fig. 11.
Fig. 12.
INVENTOR.
Arthur M. Young Aug. 14, 1945.    A. M. YOUNG    2,382,460
AIRCRAFT
Filed Jan. 8, 1941    6 Sheets-Sheet 6
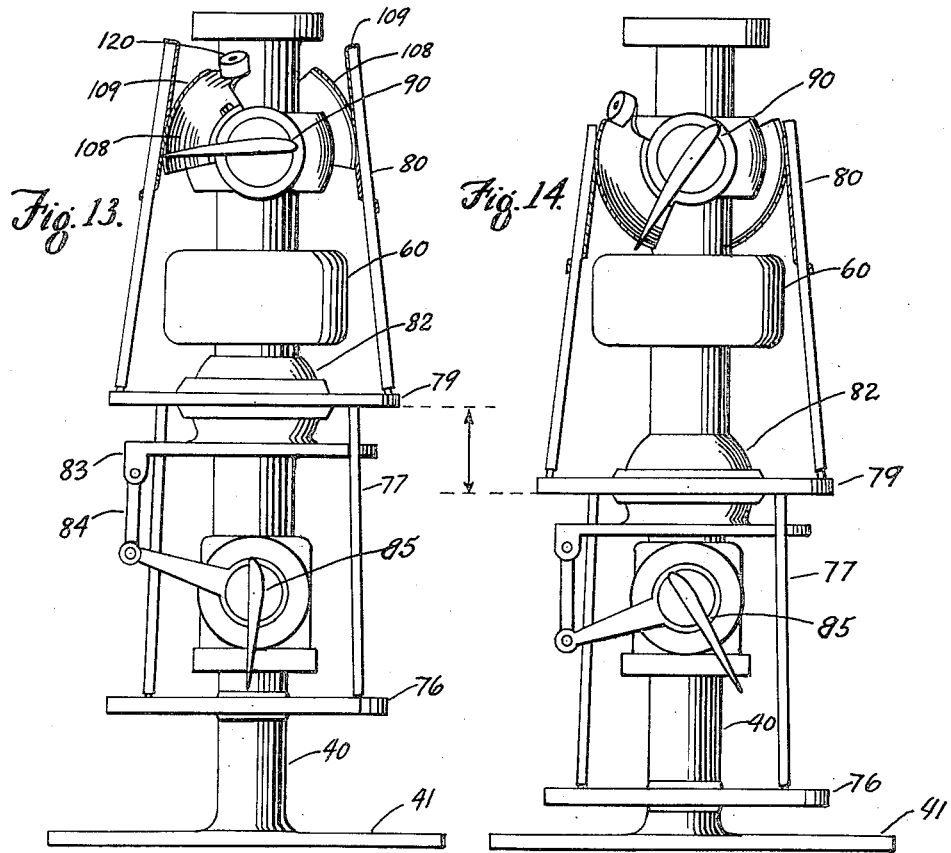
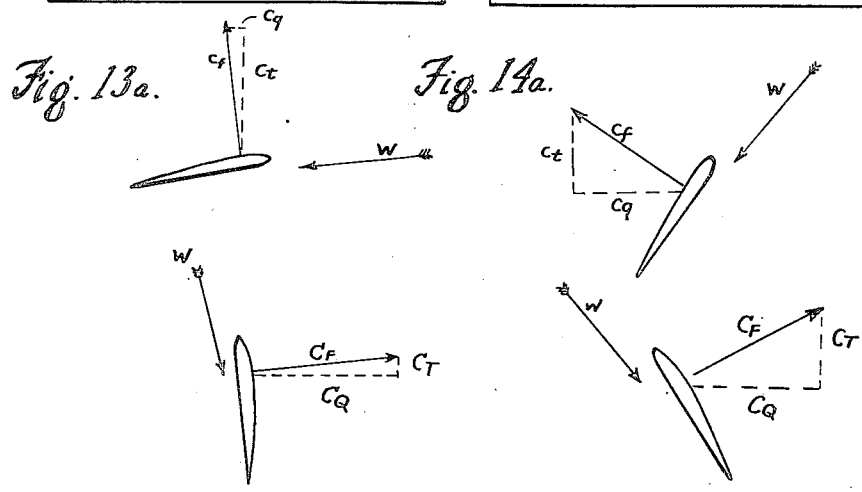
INVENTOR.
Arthur M. Young Patented Aug. 14, 1945

2,382,460

UNITED STATES PATENT OFFICE 2,382,460

AIRCRAFT

Arthur Middleton Young, Paoli, Pa., assignor to Bell Aircraft Corporation, Buffalo, N. Y., a corporation of New York Application January 8, 1941, Serial No. 373,673

22 Claims. (Cl. 244—7)

The present invention relates to aircraft. It has for its object the provision of an aircraft which will be able to take off vertically, rising into the air as a helicopter; and having risen to sufficient height, be maneuverable into an inclined position, in which position it will proceed, without loss of control, in part as a helicopter, in part as an airplane, in a generally horizontal direction at moderate speed; and will finally be maneuverable into a more greatly inclined position until the main axis of the aircraft is horizontal and it is flying at high speed as an airplane, the thrust supplied by what were the lifting propellers and lift supplied by a wing.

Such an aircraft has many desirable properties. The ability to rise vertically is an advantage in itself, but in addition it makes necessary only such an amount of wing as is needed to maintain lift at the high speed of the machine. It can, therefore, dispense with some of the unnecessary drag with which an airplane is encumbered. It is a known fact that the conventional airplane, at high speed, has more wing than is needed to supply lift but the wing size cannot be reduced because of the necessity for taking off or landing the machine at a reasonable speed.

It is readily demonstrable that a modern high speed pursuit plane of about 4 lbs. per H. P. loading would require only a 50% enlargement of the propeller diameter to produce thrust to support the weight of the aircraft vertically. However, this change alone in conventional aircraft would not produce an aircraft capable of vertical flight. In the first place the torque of the enlarged propeller would be a very serious factor, and the reduced wing that could be used at the high speeds that such a machine was designed for would be inadequate to handle this greater torque.

Therefore it is necessary to use coaxial propellers. With coaxial propellers torque would be eliminated, but take-off as a helicopter would, for efficiency, require the propellers to be rotated at a relatively high rate of speed with blades set at low pitch. On the other hand, flight at high speeds would call for the propellers to be set at very steep pitch and rotated at a lower speed of rotation. This in turn would call for a reducing gear between engine and propeller of greater ratio than that used in take-off, so that the operator would have to shift gears at least once in changing from hovering as a helicopter to forward motion as an airplane.

The present invention deals with this problem by providing a special gear and a novel method of changing the pitch of the propellers so that no gear shifting is necessary and pitch change is achieved with a minimum of effort. The manner in which this gear and this pitch change is achieved will be described in what follows.

Still further, the desired convertible aircraft would not be practical unless positively maneuverable from one position to another with stability in all positions. For example, in descent as a helicopter the usual tail surfaces of an airplane would be inadequate for control since they would be to some extent in a backward current of air.

In the case of autorotative descent with dead engine control surfaces such as are used in an airplane would be entirely unsuitable since acting completely in a backward current of air.

Therefore, the present invention departs from the classic method of control with control surfaces as used in airplanes, and obtains control from the rotating propellers, which are at all times rotating whether in rise or descent as a helicopter, in horizontal flight as an airplane, or in dead engine descent as an Autogiro. In all kinds of flight of which the machine is capable one, at least, of the coaxial rotors is maintained in a state of rapid rotation, and this lift screw provides for control of the aircraft, and, because always in motion with respect to the surrounding air, keeps itself in condition to provide adequate control in a manner as will hereafter be described.

Another object of the invention is to provide a means of obtaining very high speeds in aircraft. We have already mentioned the limit that landing speed imposes on an airplane by necessitating the use of a sufficiently large wing for the machine to land at reasonable speeds. It is well known that the high speed of an airplane cannot be more than four or five times the landing speed; and even with further improvements in wings, both from the point of view of increased lift coefficients which serve to reduce the landing speed, or from that of reduced profile and parasite drag which serve to increase the high speed, it is generally conceded that speeds much greater than those already attained are not likely. If, however, we provide a method of take-off that permits reducing the wing span we eliminate a large portion of the parasite drag and improve high speed considerably.

However there is another advantage that the present invention offers toward making possible high speed in aircraft. It is known that a propeller loses efficiency if its tip speed approaches the speed of sound. The tip speed of a propeller is the vector sum of its peripheral speed and its rate of advance, and at high speeds of advance the peripheral speed must be reduced by reducing the R. P. M. of the propeller. To absorb the full power of the engine this means the propeller must be given a high pitch setting. The high pitch setting, in turn, occasions losses through rotation of the slip stream which begin to be considerable at pitch settings greater than 50° at .75 R. To eliminate this rotational loss coaxial propellers, which reduce the net slip stream rotation by imparting rotations in opposite directions which cancel, must be used.

Thus, to obtain high speeds of advance with the airplane we are compelled to use coaxial counterrotating steep pitch propellers for good efficiency. The present invention provides just that for the high speed condition with the sole difference that the propellers in the present invention are required to be larger in diameter than those which would suffice if flight as an airplane were the sole requirement. This enlargement, however, is of advantage in high altitude flight and greatly extends the range of usefulness of the aircraft according to the present invention.

Briefly described my invention consists of a fuselage containing an engine; a drive shaft extending upwardly from the engine; a gear engaging the drive shaft and two counterrotating coaxial propellers, pitch changing mechanism for both propellers, a wing mounted on the fuselage beneath or behind the propellers and so located that the center of pressure of the wing and the propellers together is close to the center of gravity of the entire machine; a landing gear comprising shock absorbing elements adapted for resisting impact from the side of the engine opposite to the propellers, control means for feathering the blades of the upper or forward propeller, and rotating weighted means associated with the control means for automatically stabilizing the aircraft at such inclination as suits the will of the operator. To this may be added a gear shift for changing the propeller drive ratio, or in the case of the embodiment shown herewith a special gear arranged to drive the propellers with equal torque in opposite directions, but having differential properties which will permit the speed of each propeller to vary while the algebraic sum is a constant; a pitch-changing mechanism which increases the pitch of the forward or upper propeller, while decreasing it for the rear propeller (so that in take-off the forward propeller rotates at high speed and the rear at low speed, while for high forward speed both propellers have a high pitch setting and rotate at medium speed in opposite directions). With regard to this special differential gear described it is to be understood that it is not essential to the invention and that other arrangements are suitable, especially that of having a gear shift between engine and propellers in conjunction with the conventional pitch changing method. However, since the latter is not thought to be novel while the former is, only the former is described in detail.

In addition to the above problems there are other problems which arise with the present invention, such as that of seating the operator for convenient operation of the aircraft in vertical and horizontal flight; of cooling the engine, which cannot be accomplished in the manner employed in airplanes in which a high velocity cooling draft is available; and of landing the machine.

Turning now to the figures:

Fig. 4a is a view of the wing with an opening for drawing in cooling air.

Figs. 5a and 5b are other views of the same.

Fig. 7 is a view of a device for locking the automatic control.

Fig. 7a is a detail view of the control stick.

Fig. 8 is a top view partly in section of the upper hub.

Fig. 9 is a side view partly in section of the upper hub.

Fig. 10 is a view of one of the blades of the upper rotor.

Fig. 11 is a view in perspective of the upper hub and one of the blades.

Fig. 12 is an alternate form of blade construction.

Figs. 13 and 14 are views of the operation of the pitch change mechanism.

Figs. 13a and 14a are force diagrams of the blades of the two rotors in the position for operation as a helicopter and that for operation as an airplane respectively.

Figure 1:
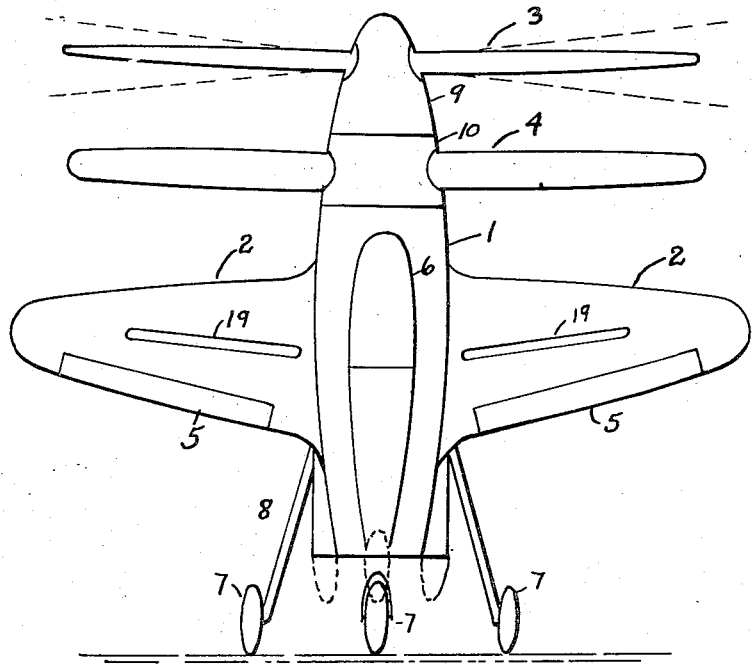
Fig. 1 is a general view of the machine in a position for take-off.
Figure 2:
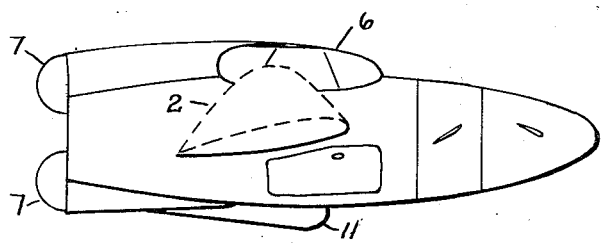
Fig. 2 is a general view of the machine in horizontal flight.
Figure 3:
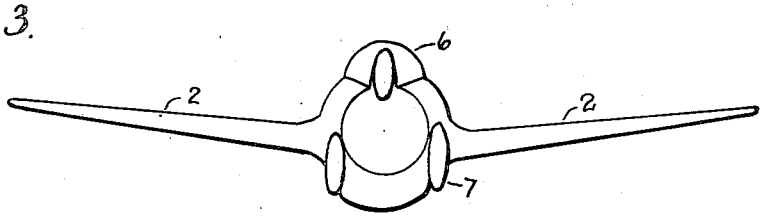
Fig. 3 is an end view as seen from the rear.

In Figs. 1, 2, and 3 1 represents the fuselage of the aircraft which is constructed to conform to the requirements of minimum drag in forward flight.

Wings 2, 2' attached to the fuselage 1 carry ailerons 5, 5' operated from the cockpit. The cockpit is enclosed in a transparent hood 6 of such shape as to maintain the aerodynamic drag at a minimum. Coaxial propellers 3, and 4 are provided in the nose of the machine. Wheels 7 support the aircraft on legs 8 when it is on the ground but are retractable in flight into a position that will reduce their drag as indicated by the dotted outlines. Spinners 9 and 10 rotate with their respective propellers and maintain the low aerodynamic drag. A scoop 11 admits cooling air to the engine. The dotted lines in Fig. 1 indicate that the forward or upper propeller 3 may incline with respect to the body of the aircraft.

*Cooling of the engine*

Figure 4:
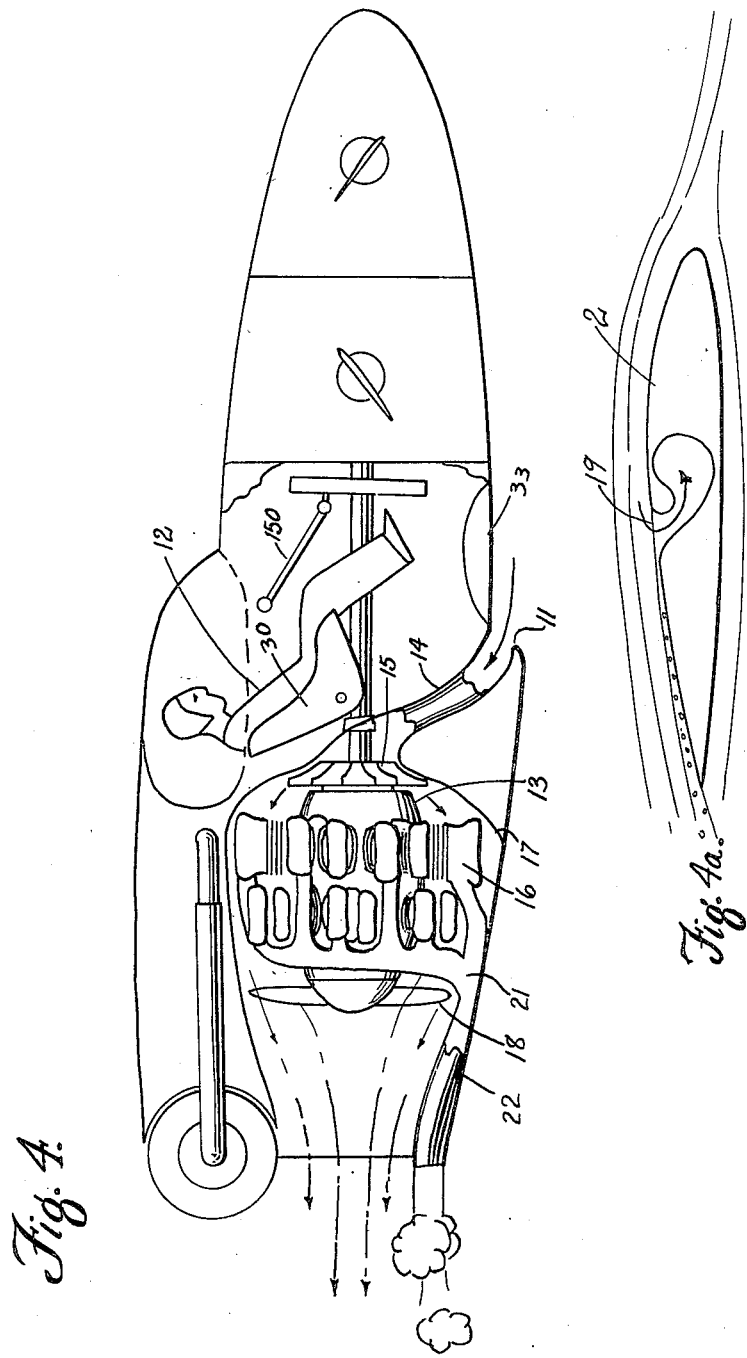
Fig. 4 is a semi-diagrammatic view in section of the machine showing the engine and pilot seating arrangement with means for cooling the engine.

Fig. 4 represents a side view cut away to show the relative position of the pilot, engine, and engine cooling means. It will be seen that the engine 13 is placed behind the operator 12. This is to bring the center of gravity of the machine well back so that the wing, which in general should be placed so that its center of pressure is close to the center of gravity of the entire aircraft, may be kept far back allowing clearance for the propellers and vision for the pilot. Since the machine is intended to land on its rear or tail it is advisable to locate the concentrated mass of the engine below the pilot, so that in event of an unduly heavy landing the pilot will be protected from injury. As my aircraft has no tail I take advantage of this to provide an exit both for the spent cooling air and the exhaust from the engine. Referring still to Fig. 4, the scoop 11 catches some of the air driven past the machine, and this air is conducted by a duct 14 to a blower 15 thence to the cylinders 16, being confined by the covering 17 which is a continuation of the duct 14. It then passes over the cylinders which may be provided with baffles in a manner well known to the art. The cooling air, having passed over the cylinders, enters the chamber behind the engine which is roughly in the form of a jet and is discharged into the wake of the aircraft. A fan 18 may be provided to further accelerate the air as it leaves the craft. The proportions of the various ducts, etc., are so designed that the air will leave the rear of the nacelle at a velocity somewhat greater than the maximum speed of the aircraft through the air, so that at all times this jet of air expelled from the rear of the nacelle provides some useful thrust and thereby helps offset the power lost through the resistance of the scoop 11. Instead of the scoop 11 an opening 19 may be provided in the wing as seen in Fig. 4a.

Fig. 4a represents a cross section of the wing 2 with an opening 19 in the upper surface of the wing, leading through the wing to the duct 14. The position of the opening 19 is such as to suppress turbulent flow indicated in Fig. 4a by the dotted wedge behind the opening 19. An opening in this position in helping to maintain nonturbulent flow over the surface of the wing reduces the profile drag of the wing and increases lift at large angles of attack. It also eliminates the undesirable resistance of the scoop 11. The opening 19 which is provided in both wings, as may be seen in Fig. 1, is located at a point about midchord on the wing. It should be selected to coincide with the point at which breakdown in the flow of the wing occurs.

Since the present aircraft is intended to be capable of hovering and moving at slow speed, the means ordinarily employed in airplanes for cooling the engine, which depends on a relatively high slipstream velocity, cannot be depended on for cooling the engine of the present aircraft. So the problem of cooling is especially acute, and the means here described for meeting the problem is quite relevant to the invention.

This means for cooling an engine is not confined in its usefulness to the particular aircraft herein described, however it would be useful in any case where an engine was enclosed in a streamline nacelle and cooling air drawn in. The originality of the device here described rests in drawing the air for cooling and carburation from such a portion of the aircraft as will benefit streamline flow, and further in discharging it from the rear of the nacelle where it will not disturb established flow, and will in fact supply thrust by a moderate jet effect.

The engine shown in Fig. 4 is of the aircooled type. It is obvious, however, that the same principles could be applied to the liquid cooled type. My study of cooling has led me to believe that greatest cooling efficiency results when slowly moving air is conducted through a relatively large radiator. This implies that the air of the slip stream is moving much to fast for maximum efficiency. Hence it is a great advantage, to provide means by which the rapidly moving air of the slip stream may enter the nacelle, be expanded and slowed down, pass through the radiator, and then be speeded up and expelled from the aircraft at as great or greater velocity than that at which it entered.

This same principle is applied also to the carburation and exhaust in my aircraft. The air for the carburetor intake is drawn from the duct 14. The exhaust gases issuing from the cylinders 16 are collected in a manifold 21 which empties into a chamber 22 partitioned off from the jet shaped chamber to the rear of the engine. Since the exhaust generally has a high velocity as it leaves the cylinders the chamber 22 may be designed to maintain this velocity to the point at which it leaves the aircraft.

*Pilot seat*

Figure 5:
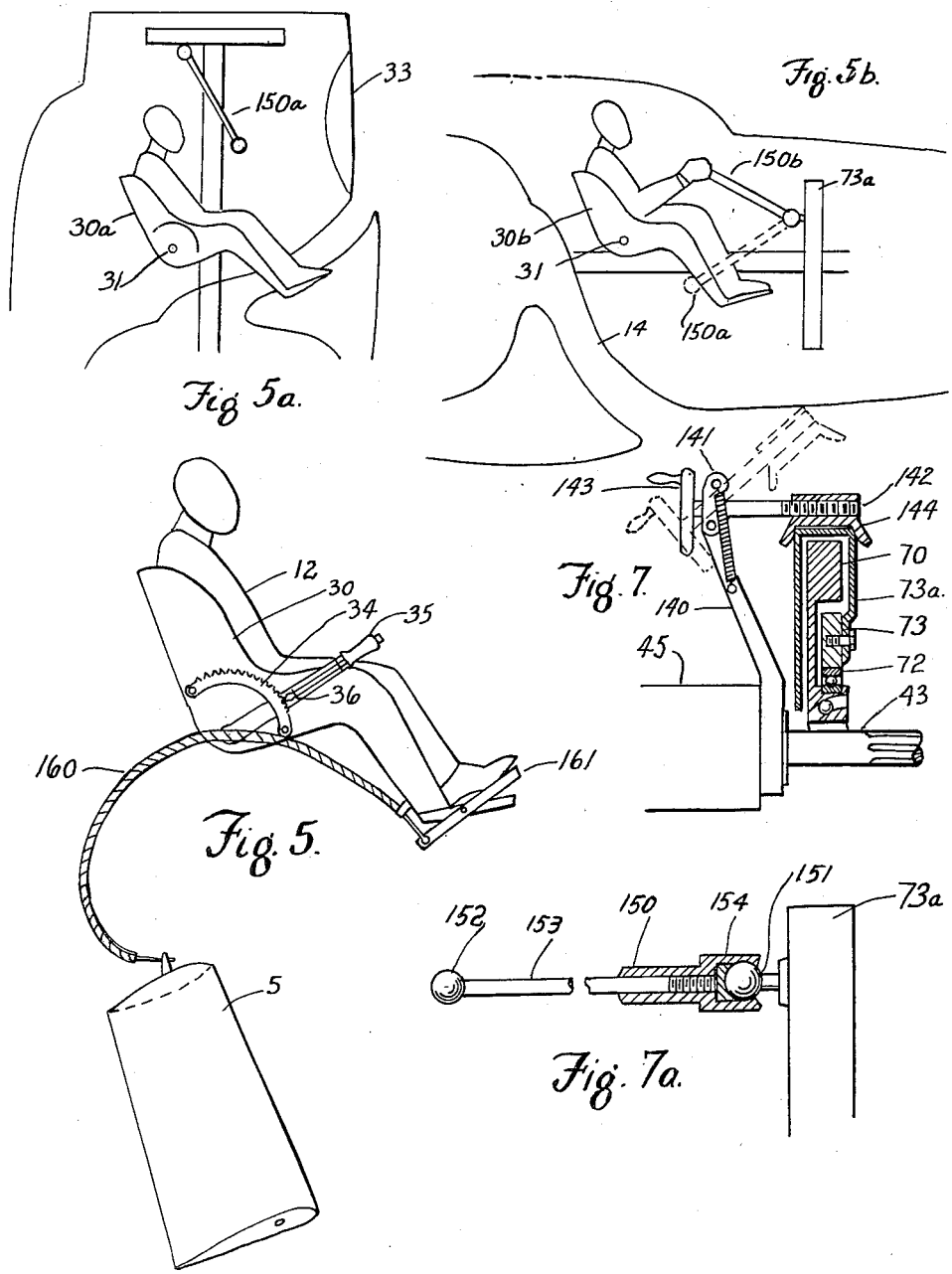
Fig. 5 is a view of the pilot seating arrangement.

Fig. 4 and also Figs. 5, 5a and 5b, show the arrangement for seating the pilot. A seat 30 is provided and mounted so as to be inclinable about the pivot 31. In Figs. 5a and 5b the seat 30 is shown in two typical positions. Position 30a is intended for take-off when the main axis of the craft is vertical; position 30b is intended for forward flight when the axis of the aircraft is generally horizontal. An additional window 33 may be provided for use when the axis of the craft is vertical.

The seat may also be used to enable the pilot to tilt forward in order to endure severe accelerations such as when the craft is making a rapid maneuver. It has been found that the loss of consciousness resulting from great acceleration is due to the blood being forced away from the brain, and that if the pilot occupy a prone position, lying either on his back or on his stomach, he is enabled to undergo acceleration greater than 12 times gravity for protracted periods.

The present invention provides means in the tilting seat to enable the pilot to lower his head on a level with his body during the duration of a "pull-out" for example. In addition there is provided means for moving the control stick, which will be explained in detail further on, to a position convenient for operation from either position of the seat. This also, though an essential requirement of the present aircraft, might be usefully employed in any high speed aircraft of maneuverability sufficient to involve pilot's ability to withstand acceleration.

Fig. 5 shows the method by which the pilot's seat is adjusted. A circular toothed rack 34 is attached to the pilot's seat 30 and concentric with 34 a pivot 31 enabling the seat to be inclined. A handle 35 is attached to the body of the aircraft convenient to the pilot and carries a catch or ratchet 36 engaging the toothed rack 35. To adjust the seat the pilot grasps the stick and opens the catch. This frees the seat which he can then pull forward or push back into the desired position, whereupon he releases the catch and the seat remains fixed till further adjustment is made.

The control stick 150, to be described in more detail below, is to be seen in Figs. 5a and 5b in two positions, 150a and 150b, suitable for operation when the pilot is in the position 30a or the position 30b. In Fig. 5 the operation of the ailerons 5 is depicted. A pedal 161 is built in to the inclining seat 30 and is attached through the wire and cable 160 to the aileron 5. A similar pedal with wire and cable is attached to the aileron on the left. In operation the ailerons 5 are used to orient the machine or turn it about a vertical axis when it is hovering or when it is climbing as a helicopter. When the machine is flying horizontally ailerons 5 are used to bank it as when making turns, or, generally speaking, to give lateral control.

*Rotor drive*

Figures 6, 6A:
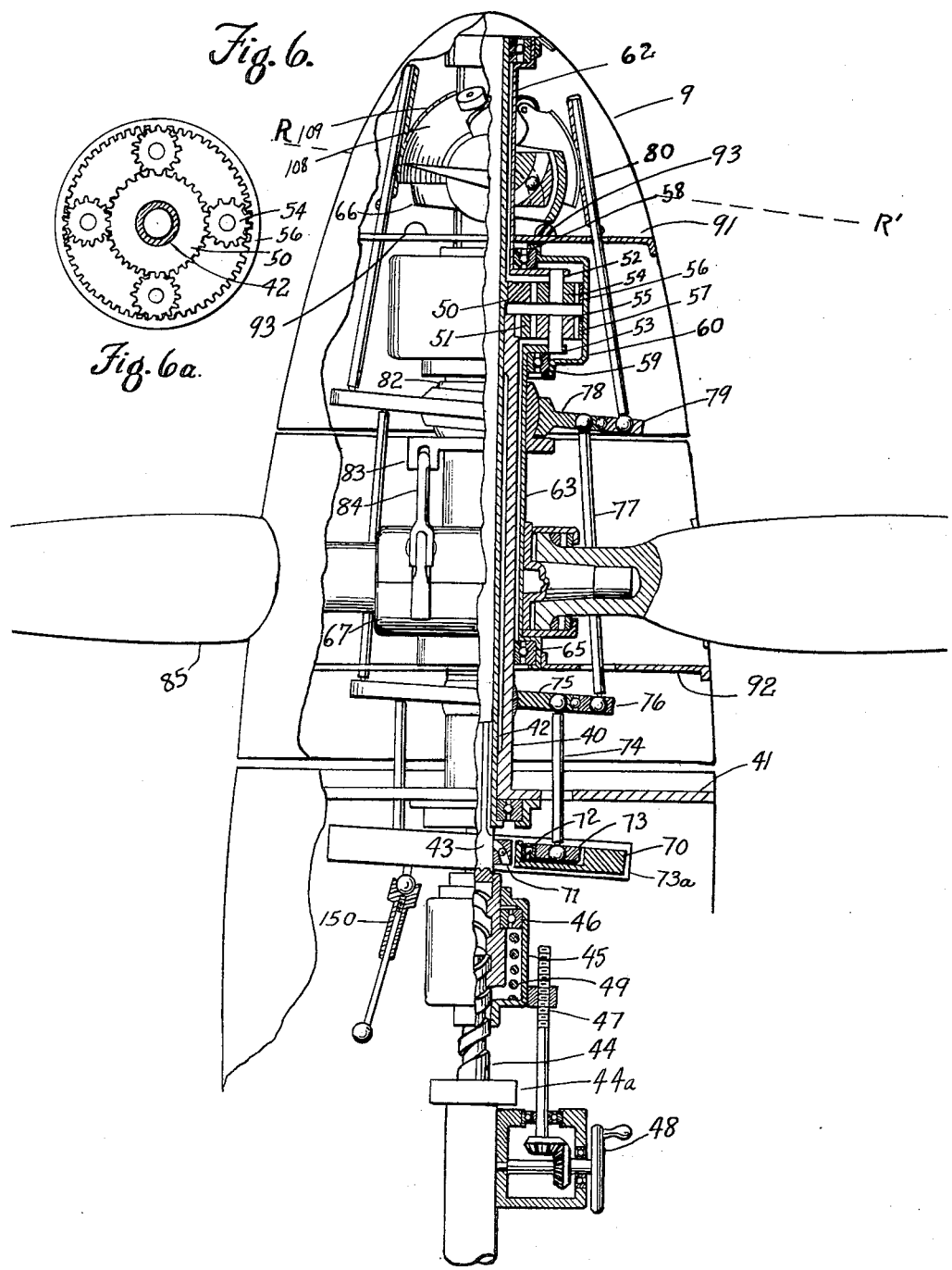
Fig. 6 is a view partly in section of the front end of the machine showing the propeller hub, the drive and the blade angle controls.
Fig. 6a is a plan view of the gear case.

Fig. 6 shows partly in section a view of the nose of the aircraft with the details of the drive for the two propellers, the construction of their hubs, and the blade angle control which accomplishes the several functions of pitch control, feathering of the upper rotor for maneuvering the machine, and automatic feathering for stability.

A mast 40 is attached rigidly to the forepart of the aircraft, in this case a plate or bulkhead 41. Inside the mast a tubular shaft 42 is mounted for rotation. The shaft 42 carries splines at its lower end adapted to receive the upper end of a shaft 43. The shaft 43 is free to slide in these splines in an axial direction in response to the engine torque, which it receives from the shaft 44, which engages it through steep pitch threads cut in such manner as to draw the shaft 43 down when the engine is delivering torque. A freewheeling device 44a is included in the drive between the engine and shaft 44.

At the upper end of shaft 42 a gear 50 is mounted. Below gear 50 a similar gear 51 is keyed to the upper end of the mast 40.

Referring now to both Figs. 6, and 6a which is a plan view of the gear case, spiders 52 and 53 are mounted concentric with gears 50 and 51 and carry sets of planetary pinions whose inner teeth mesh with the corresponding gears 50 and 51. Ring gears 56 and 57 are firmly attached to a casing 60 which is supported on ball bearings 58 and 59. The ring gears 56 and 57 mesh with the outer teeth of the sets of pinions 54 and 55. In Fig. 6 the spiders, which in this case are the driven members, are secured to tubular shafts, 52, to the upper tubular shaft 62, and 53 to the lower tubular shaft 63. The upper shaft 62 carries the hub 66 of the upper rotor or airscrew and is supported at its upper end on the ball bearing 64. In a like manner the lower shaft 63 carries the hub 67 of the lower rotor or airscrew and is supported by the ball bearing 65. So constructed, the drive supplies equal torque to both airscrews and maintains their rotation with respect to each other in fixed relation to the engine speed while still permitting their individual speeds with respect to the fuselage to vary. In addition the drive provides a convenient and efficient reduction in the engine speed.

Mounted as shown the reduction is determined by the formula wherein IG and SG are number of teeth in the internal gear and sun gear respectively:

$$R = 2 + \frac{IG}{SG}$$

R, the reduction, is roughly 5:1 so that the propellers will each turn ⅕ engine speed, or if one is not turning the other will turn ⅖ engine speed.

A further feature of the drive is that with the ring and planetary arrangement no bearing is necessary for the tubes at the driven end, because the planetary pinions themselves act as roller bearings and center the spiders around the driving gears. The question of side strains due to twisting of the propeller hubs is answered by noting that the upper screw, being universally attached to the tube 62, as will be seen in what follows, causes no side strains, and the lower hub is remote from the gears so that such strains as it does produce act as it were at the short end of a long lever and do not exceed the ability of the gears to resist.

The free wheeling device 44a permits the upper rotor to auto rotate in event of engine failure. The position of the freewheeling device is such as to leave the flywheel connected by gears to the upper rotor, so that in event of engine failure the upper rotor in its continued rotation compels the continued rotation of the flywheel which maintains the automatic control as will be seen in what follows.

*Upper hub*

Fig. 8 represents a plan view of the upper rotor. In the embodiment shown hub 66 is constructed as a constant velocity universal joint comprising the inner core piece 66, which is attached to the tube 64 and the outer piece 100 which rolls on the inner core member on four balls 101 fitted in curved tracks in the appropriate manner. It is desirable but not essential to employ the constant velocity joint. If an ordinary universal joint be employed it is then necessary to provide a cushion in the drive at some point in order to permit the irregularity which characterizes the ordinary universal joint. My experimental work to date has indicated preference for the two degrees of freedom supplied by the universal joint. However the "see saw" motion, or ability of the propeller to rock about an axis perpendicular to the blades is not essential to the operation, it being sufficient to provide for rotation about an axis extending longitudinally in the blades.

The outer core piece 100 carries two threaded members 102 which hold the inner races of ball bearings 103 capable of bearing high thrust loads. The members 102, in Figs. 8 and 9, have a projecting stud provided with a hemispherical end 104, and shoulders 105 cut to a spheroidal form, the center of curvature of which coincides with the center of the hemispherical end 104. Inside the shoulders 105, the diameter is cut smaller than the root diameter of the threads at the inner ends. This reduced diameter serves to prevent fatigue stresses being concentrated on the roots of the threads, and distributes them over a relatively extended area.

Still referring to Fig. 8, a bushing 106, or rubber or other suitable elastic substance, surrounds the reduced diameter of the members 102, and has an outside diameter slightly larger than the maximum diameter of the threads of this member. This bushing may be split for mounting, or may be stretched and slipped over the threads. The inner race of the ball bearing 103 fits closely over the bushing 106, and is ground to a concave curvature at one end to fit against the convex curvature of the shoulders 105. A nut 107 fits over the ball bearing 103 and is provided with threads engaging the inner end of the blade 90. A tapered hole with a spherical bottom is provided in the end of the blade, and this fits over the spherical ends 104 of the members 102. The stud 102 is firmly locked in the hub 100 by bolts 112 which are enabled to clamp tightly the stud 102 either by slitting the hub 100 or by separating a piece 113 which carries part of the threads that engage stud 102 and clamping it to the hub through bolts 112. This construction permits the blades to undergo slight displacement in operation and hence to relieve the stresses on the various parts which hold the blade and allow it to be turned about its own axis. It will be understood, of course, that in rotors in general centrifugal force plays a major part in holding the blade in position, and is so great that the lift of the blade normally suffices to lift it only a degree or so out of the plane perpendicular to the axis of rotation. When abnormal lift develops, as when banking or maneuvering the aircraft, the lift force may rise to several times normal. This would put a bending strain on the blade were it not for the flexibility afforded by the construction shown in Fig. 8, which allows the blade to hinge around the center of sphere 104, shifting the bearing 103 as it does so and compressing the elastic bushing 106. The displacement is accomplished without cocking of the ball bearing, and at the same time is damped by the hysteresis of the rubber bushing 106 and by friction against the collar 105.

Again the rubber bushing urges the blade back into a normal position when the abnormal forces subside.

This construction permits the blades 90 to undergo slight displacements under the varying loads experienced when the machine is violently maneuvered, and generally relieves the stresses that would take place in a rigid structure.

*Blade construction*

Fig. 10 represents the construction of the blade 90. The blade is constructed in two longitudinally extending pieces of different specific gravity, one comprising the leading edge or the front quarter of the blade, 110 in the figure, and the other comprising the remaining rear portion of the blade, 111 in the figure. Convenient materials are Duralumin and light wood, or steel and heavy wood, though other material can be used. The specific gravity of the forward piece 110 should be sufficiently greater than that of the trailing piece 111 to insure that the center of gravity of the blade will be close to its center of pressure, which for the most suitable airfoil sections is about 25% of chord from the leading edge. The two parts of the blade may be secured to each other by screws, cement or binding, and they may be fitted with tongue and groove to insure their better alignment. A feature of the preferred construction is that the root of the blade is comprised of the thickened continuation of the forward piece, which since it is of heavier material is stronger than the trailing material. This greater strength in the root is of great advantage in blade construction as it is the root that is the most highly stressed part. In Fig. 10 the forward piece 110 becomes thicker toward the inner end, coming finally into a heavy inner end of circular section upon which are cut the threads that engage similar threads on the collar 107.

Fig. 11 is a perspective view of the blade including the cuff 108 and the attachment of the rod 80 to it. Fig. 12 shows an alternate construction in which the blade is constructed of a structural member 121 over which is slipped a sleeve moulded into airfoil shape. The member 121 is similar to the member 110 but the trailing edge 111 is omitted.

The upper rotor, being capable of feathering and inclination in any direction, is essentially a helicopter rotor, and must meet the exacting requirements of such rotors, which are more exacting than the requirements of conventional airplane propellers. A particular requirement is the balance of the blade about its quarter chord, which is not essential in airplane propellers. However, once this requirement is met, and a blade made that balances on its center of pressure, great benefits result, for the blade may be greatly reduced in weight. Such a construction can be applied to airplane propellers with advantage, especially in the case of very large propellers where the weight of the blades is important, for blades of this type may be made considerably lighter than airplane blades and still have adequate strength. Besides reducing the weight of the blade itself, such lightening reduces the power required to change the pitch of the blades by reducing the weight of the blade in the portion remote from the turning axis of the blade, and so indirectly saves weight in the pitch changing mechanism. Further, it reduces the size and weight of the bearings. Again, flutter is eliminated with the present construction.

With regard to flutter, it may be noted here that in the design of airplane propeller blades it has been customary to overcome flutter by brute strength in the blade, that is by making the blade so strong that the tendency to develop flutter is prevented. In the development of blades for rotor craft it has long been recognized that it is necessary for blade stability to design blades that have their C. G. generally at or near their C. P. I have found that blades so designed eliminate the flutter that rigid propeller blades are subject to.

The blades for the present invention, being intermediate between blades for rotor craft, which are large and lightly loaded, and blades for propellers of airplanes, which are small and heavily loaded, combine the structural requirements of both kinds of blades which in the rotary wing blade call for mass balancing around the center of pressure and in the propeller blade call for a particularly heavy section at the root of the blade where stress is a maximum. The method of meeting these requirements, that of having a member of relatively strong material at the leading edge of the blade, the said member gradually thickening toward the root, and having its greatest cross section at or near the point of connection to the hub, and of making the rest of the blade of relatively lighter material, is believed to be novel and of general utility for all types of aircraft blades.

Further, in the past it has been an object in the construction of blades for rotary wing aircraft to provide a spar located at the center of pressure of the blade, and weighting in the blade ahead of this spar for moving the center of gravity of the blade forward. This construction is inefficient in that the weighting means is not useful in supplying strength to the blade. I have found that in the rotor blades of this type it is not at all necessary to place the stress carrying spar at the center of pressure and that it may perfectly well be placed ahead of the center of pressure, where its weight may be usefully employed for bringing the C. G. of the whole blade forward.

The reason for this is that the blade will always tend to turn around its C. G. regardless of the spar position, whereas it had been thought it would turn around the spar. Only if the spar were perfectly rigid, which in practice it is not, would it be of any importance to locate the spar at the C. P. of the blade.

Therefore it will be seen that the construction herein described is of value in general in rotary wing blades, even where such blades, due to vertical and horizontal hinges at the root of the blade, do not require especially great strength near the root, as is the case with the blades of the present preferred rotor construction and with rigid propeller blades in general.

Returning to Fig. 8, and also to Fig. 11, the collar 107 carries on its periphery a skirt-like projection, or cuff, 108, which is so designed to present a cylindrical surface near the mid point of the rotor where it is engaged by the rods 80 through the medium of flexible cables 109 of which there are two on each rod, one of which is attached to the upper boundary of the cuff 108 and wraps around the cylindrical portion of the cuff, is secured to the rod 80 at a point below its point of contact with 108. Another similar cable 109b is attached to the lower end of cuff 108, wraps around the cylindrical portion of its surface, and is secured to the rod 80 at a point above its point of contact with 108. This construction provides means for translating the reciprocating motion of the rods 80 into rotary motion of the hub outer part 100 for feathering, as when one rod goes up and the other goes down due to inclination of the control plate 79, or for simultaneous increase of pitch of both blades for pitch change as when the control plate 79 is axially displaced without inclination. Counter weights 120 are attached to the cuff 108. Their function is to balance out the force opposing change of pitch and relieve the feathering mechanism from bearing the full force due to holding the blade at an angle with their flight path.

*Pitch control system*

I will now describe the control system in Fig. 6. As was seen above a shaft 43 rotates at engine speed and is axially movable in response to engine torque. This shaft, hollow at its lower end and provided with a steep pitch female thread, receives the male thread of the engine shaft 44. Enclosing the junction of these two shafts is a cylinder 45, a stop on its inner surface bears against a ball bearing 46 secured against end motion of shaft 43 and regulates the axial movement of the shaft 43 on the shaft 44. The cylinder 45 is positioned by the threaded rod 47 rotated by a wheel 48 convenient to the operator. A spring 49 inside the cylinder 45 serves to maintain shaft 43 against the upper stop when the engine is not supplying torque. Downward movement of the shaft 43 is limited by contact with lower end of case 45.

The axially movable shaft 43 carries a flywheel 70 mounted upon a constant velocity universal joint 71. The mass of this flywheel is coplanar with the neutral point of the universal joint 71 and carries on ball bearings 72 a ring 73 in which the spherical ends of rods 74 are journalled. These rods, preferably four in number, pass through the bulkhead or framework 41 and are journalled in a like manner to another ring 75 upon which turns a third ring 76, which is in turn fitted with rods 77 which lead up past the hub of the lower airscrew to a fourth ring 78. This ring and the ring 76 rotate at the same speed as the lower airscrew. Upon the fourth ring 78 a fifth ring 79 rotates with the upper airscrew and carries two rods 80 which lead to the cuffs 108 extending from the blades 90 of the upper rotor. (These blades and the cuffs 108 are more distinctly visible in Figs. 8, 9, 10 and 11.)

This construction provides a means of transmitting axial motion of the rods 80 into rotational movement of the blades, 90, at the same time maintaining the point of contact of the rods 80 at the same height relative to the rotor itself, a desirable criterion as will be seen in what follows. The inner ring 78 is inclinable upon a spherical bushing 82 which is free to slide on the tube 63. Bushing 82 incorporates lugs 83 to which are journalled the rods 84 whose other ends are pinned to extensions from the blades 85 of the lower airscrew. So constructed, the movement of the bushing 82 produces change of pitch in the lower airscrew.

In the embodiment shown the lower airscrew undergoes change of pitch only, while the upper airscrew undergoes change of pitch and also feathering, the distinction in this case being between simultaneous change of angle of the separate blades (i. e. increasing the angle of attack of both with respect to the air) which I prefer to call a pitch change, and the differential change of angle of separate blades (i. e. increasing one and decreasing the other) which I call feathering.

For example, referring to Fig. 6 and also to Figs. 13 and 14, if the bushing 82 moves down, the two rods 83 are both moved down and the corresponding blades 85 are reduced in angle of attack; however, if the ring 78 rock on the bushing 82 no change takes place in the blades 85 while the blades 90 of the upper rotor are "feathered," or, which is the same thing in the present construction, the upper rotor is rocked about its long axis, one blade losing in angle what is added to the other.

Hence it will be seen that the two airscrews differ. The upper one is a rotor typical of helicopters in which the blades are capable of simultaneous and differential change of angle, and the other is a controlable pitch propeller such as is used on conventional airplanes. The reason for this difference is that the forward rotor in the present aircraft is used for control since it is in a position to exert greater leverage, being further from the C. G. of the aircraft.

A further departure from conventional practice lies in the fact that a lowering of the bushing 82 causes an increase in the pitch of the upper rotor and a decrease in the pitch of the lower rotor. This will be seen more clearly in Figs. 13 and 14. In conjunction with the gearing described the effect is that the rotors rotate at different speeds, that with the lower pitch rotating faster than the other, while the torque into each rotor is, by the nature of the gear, equal. Referring now to Figs. 13 and 14, the blades are shown in Fig. 13 in the position for auto rotative descent, and in Fig. 14 in the position for high forward speed, the two extreme positions. In Fig. 13 the bushing 82 is up, the blades 90 of the upper rotor are at an angle of approximately 5°. The condition indicated in the force diagram Fig. 13a is a slightly greater angle of about 10° for hovering, where the resultant has a large lift component and a small drag or torque component. The blade 85 of the lower airscrew is at a steep angle of about 90°. The resultant of airforces on this blade, shown also in Fig. 13a, has a low lift or thrust component and a high torque component. Since the gear drives the propellers with equal torque the upper propeller rotates faster than the lower, in fact as much faster as will make their torques equal. This condition may be expressed by a simple formula. Representing the R. P. M. and torque coefficient of the upper and lower rotor by $n$, $c_q$, $N$ and $C_Q$, respectively:

$$n^2 c_q = N^2 C_Q$$

so that if the torque coefficient of the lower rotor is 9 times that of the upper, the lower will rotate at ⅓ the speed of the upper. Hence the lower rotor will draw from the engine ¼ of the power to the ¾ drawn by the upper rotor, since power is proportional to R. P. M. times torque, and torques are equal.

As the aircraft increases in forward speed the pilot increases the pitch of the forward airscrew. This has the effect of tipping the resultant force on the blades of the upper screw back which increases the torque coefficient and hence reduces the R. P. M. on this airscrew. At the same time the increase in forward speed has the effect of reducing the angle of attack of the rear airscrew blades, this in turn reduces the torque coefficient and results in the rear airscrew rotating faster. In the preferred embodiment shown the pitch of the lower or rear airscrew is reduced as that of the upper or forward one is increased, which aids and amplifies the action, by increasing total change in angle of attack over that which results from forward motion alone. It is not necessary that the rear or lower screw change its pitch, however, it may be set at approximately 60° and the effect will not be greatly different from that occurring when the lower rotor undergoes change of pitch. (Efficiency in rapid vertical ascent is better when both propellers change pitch.)

Continuation of the process outlined, with the forward airscrew increasing in pitch and decreasing in R. P. M. will bring the blades into the position shown in Figs. 14 and 14a. Here both sets of blades have the same high angle about 55° and the same R. P. M. The value of the new R. P. M. will be approximately ⅝ that of the upper screw in its low pitch condition. In the diagrams 13a and 14a the vectors $C_f$ are the force coefficients of the blades in the various positions, $C_T$ being the thrust component and $C_q$ the torque components of these vectors. The arrows W indicate wind direction in each case.

$$F = C_f \times n^2, \ T = C_T \times n^2, \text{ and } Q = C_q \times n^2$$

are the total force, thrust, and torque of the same blades multiplied by the appropriate R. P. M.'s which are chosen as 1,000 for the upper screw, 250 for the lower screw in the helicopter, and 625 for both screws in the high speed airplane phase. This of course on the basis of constant engine speed.

Thus it will be seen that this method of changing pitch in combination with the special constant torque gear gives in effect a kind of variable speed transmission, which varies continuously from a drive with a ratio suitable for take off as a helicopter, to one that is suitable for forward flight as an airplane. In the particular instance described the take off R. P. M. was 1,000 and the high speed R. P. M. 625, all this while the engine speed is constant. By the use of a gear shift both propellers can be simultaneously changed in pitch following conventional practice. This will improve efficiency, a greater lift being available when both propellers are lifting, instead of having one as an antitorque vane; this however depends on the use of a satisfactory gear shift, the design of which is beyond the scope of the present application.

That it is desirable to have the R. P. M. of the propeller at high speed less than that at the take-off is a fact recognized in the art, and the reason for it is to be found in the importance of maintaining the tip speed below the speed of sound. The actual speed through the air of the propeller tip is the resultant of the rotational speed and the translational speed. At take off the translational speed is small and the rotational speed may be such as to cause the peripheral speed to come close to the speed of sound. Were this peripheral speed maintained, however, at large translational speed the total tip speed would exceed that of sound, and would occasion very serious losses. Therefore, as translational speeds increase it is necessary to make a corresponding reduction in the rotational speed.

It is also generally recognized that for airplanes designed for ultra high speed a gear shift giving extra reduction to the propeller for use in the high speed phase would be of value, though entailing difficulties because of the necessity of shifting gears in flight. In the present invention there is the same need, to a more pronounced degree, for a gear shift, if the propellers are handled in the usual fashion with regard to changing their pitch. However, by changing the pitch in the manner described above, the propellers being geared to the engine by the equal torque method described above, the need for changing gears is eliminated.

The control of pitch change is accomplished by the operator with the aid of the engine torque through the wheel 48. If he desires to increase the pitch of the upper rotor, as for instance for greater speed, he rotates the wheel 48 in a direction to bring the cylinder 45 down toward the engine. The engine torque will then pull the shaft 43 down against the lower stop in cylinder 45, drawing with it all the control plates and the rods 89 which by virtue of their cable connection to cuffs 108 roll the latter down and increase the pitch of the blades to which they are attached. This rolling is accomplished without shifting the position of the point of contact of the rods 80 with the cuffs 108 with respect to the neutral point of the universal joint hub of the upper rotor, and hence not interfering with the feathering control.

To reduce the pitch the pilot temporarily throttles the engine sufficiently to relieve the pressure of the member 43 against the lower stop in the cylinder 45, and turns the wheel 48 to move the cylinder 45 upward. When the pitch is reduced to the proper value he opens the throttle and the increased engine torque holds the pitch at that value until further adjustment is made.

Feathering control system

In the present invention control of direction is had through shifting the plane of rotation of the forward propeller by feathering the blades. This dispenses with the need for a tail and provides a system of control that is equally effective when the aircraft is hovering or climbing as a helicopter, or descending as an Autogiro.

The means used to accomplish this feathering may be seen in Fig. 6. Here it will be noted that the control ring 79 is inclinable with its inner ring 78. This in turn is inclined by rings 76 and 75 and these in turn by control plate 73. The inclination of 73 is achieved by the pilot through the stick 150. The stick 150 may be seen in Fig. 6 but is shown in greater detail in the enlarged view Fig. 7a.

Referring to Figs. 6 and 7a, the flywheel 70 is enclosed in a case 73a attached to the lower control ring 73. To this case the control stick 150 is attached at a point above or ahead of the operator. The attachment is through a ball and swivel 151, which may be tightened or released by turning the knob 152. The knob 152, attached to the threaded rod 153, when turned tightens the spherical seat 154 against the ball 151. Through this stick the operator is able to change the inclination of the flywheel (and hence of the machine) by applying force to it and is at the same time able to release the control stick while changing the seat position, or to bring it into whatever position is most convenient for exerting force upon it. As described in a previous application, the operator must exert a force on the stick 90° ahead of (as measured in the direction of rotation of the engine shaft) the desired inclination of the flywheel.

Thus the pilot, through the control rods and rings above mentioned and the two rods 80, rocks the hub of the upper rotor, in so doing feathering the blades and changing the inclination of the rotor. In Fig. 6 the plane determined by the rotation of the blades is indicated by the dotted line R—R'. The rotor, inclined as shown, exerts a pull to the right on the upper end of the machine. In this way the pilot is able to pull the mast in any direction by manipulation of the lower plate 73.

Framework 91 supports the forward or upper spinner 9 and may serve to locate the rods 80. It may also carry rubber stops 93 which present too excessive feathering action. A framework 92 supports the lower spinner and helps locate rods 77.

*Engine failure*

Should the engine at any time stop supplying power to the rotors, the spring 49 forces the shaft 43 up against the upper stop in the cylinder 45 and hence lifts the control plates and reduces the pitch of the upper rotor. If the aircraft is in the high speed phase when the engine stops the result is to put the forward rotor in a windmilling condition and due to the free wheeling device in the gear 50 this rotor will continue to rotate. The operator should then maneuver the machine into a position with the forward rotor pointing straight up, meanwhile reducing the pitch to a value suitable for auto rotation in descent, which is roughly zero degrees. The machine will then start to descend tail first and the relative wind will move upward through the rotor maintaining it in auto rotation. Auto rotation being thus assured the pilot may check his descent by slightly increasing the pitch through the operation of the control wheel 48 to a value of some 4° or 5°, a value which will give maximum braking effect on descent and still maintain auto rotation. He will be able to guide his descent by feathering the rotor in the usual way. As he gets close to the ground he may suddenly increase the pitch to some 10° or 12°. This will temporarily exert an increased lift and cushion the shock of landing. This, however, exhausts the energy of rotation of the airscrew and should not be employed until the machine is about to land.

It may here be noted that although changes of pitch in general require the exertion of too great a force to be achieved by a manual control only, such changes are entirely possible when the pitch is less than 10° or 12°, for the force opposing increase of pitch is not large in this range. Further, the operator may at any time make a decrease of pitch without the assistance of the engine, the force on the blades being such as to make them seek the low pitch. So it is, that regardless of the pitch of the blades when the engine fails, the operator is able to make the necessary pitch changes for a good landing without assistance from the engine.

*Automatic stability*

The control plate 73, Fig. 6, is connected with the flywheel 70 which is secured to the shaft 43 through a universal joint and by virtue of this construction is free to incline with respect to the shaft 43. Further, the inclination of the flywheel with respect to the main axis of the aircraft determines, through the intermediate rings and rods, the inclination of the upper rotor. Due, however, to the fact that the distance of the lower ends of the rods 80 are further from the center of the mast than the upper ends, the inclination of the flywheel 70 with respect to the mast is accompanied by a greater inclination of the rotor around its rocking axis (in Fig. 6, perpendicular to the plane of the paper).

In operation the flywheel tends to preserve its inclination in space due to its inertia. If the mast inclines with respect to it, the construction described above operates to produce an inclination of the rotor in the opposite direction to the inclination of the mast. This opposite inclination pulls the mast back into perpendicularity with the flywheel and maintains it thus until the operator causes the flywheel itself to tip.

The ratio of the distance of the lower ends of the rods 80 from the mast and the distance of the upper ends from the mast determine what may conveniently be termed the stability factor. In the drawings this ratio is shown somewhat greater than is necessary in practice, in fact the ratio may be quite close to 1 and operate satisfactorily. A value of 1 would give neutral stability while values greater than 1 give positive stability. The essential nature of this method of control is that with the flywheel controlling the rotor, small displacements of either the machine or the rotor are not accompanied by changes in the control of the rotor, there is, as it were, no feed back. My experiments with the stability of helicopters have shown that the source of instability of machines of this type as ordinarily constructed is the fact that the rotor tends to follow small displacements of the mast so leading to an amplification of the causes that initiated the displacement. By controlling the rotor through the flywheel the rotor is made independent of displacements of the mast, or in the case where the stability factor exceeds 1 is made to positively oppose displacements of the mast, but in any case there is no cumulative effect.

What this means may be illustrated by an example. If it were attempted to fly an airplane tail first it may be appreciated that if the tail became displaced upwardly for example, it would at once exert a greater lift, and hence displace itself still more. This is what is meant by a cumulative effect and is roughly speaking what occurs in any aircraft depending on a propeller for lift or propulsion. For as ordinarily constructed such aircraft have the propeller above the center of gravity in the case of a helicopter, or ahead of it in the case of an airplane. Now the propeller is an air foil and when displaced from a position exactly to the windward of center of gravity, is subject to a yaw force that displaces it still further. In the airplane this force is counterbalanced by the tail which creates a stabilizing effect sufficiently greater to make the whole machine stable, but in the helicopter such a stabilizing surface as the tail of the airplane is not readily available, and if introduced occasions other difficulties. In the present invention, since stability is obtained from the propeller itself, no tail or other stabilizing surface is necessary. So it will be seen that my invention in its broadest aspect offers a new method of obtaining stability and control in helicopters, airplanes, or aircraft that function in both capacities.

It might be thought that the flywheel is a disadvantage in the added weight, however I have found that the flywheel may be quite light provided, however, that the friction in the blades controlled by it is reduced to a small amount. In fact the rotor described in my copending application, Serial Number 289,719, a rotor designed to reduce feathering forces to a minimum, is most appropriate for use with the flywheel, and it is such a rotor that is described in the present preferred embodiment. It may be pointed out that this rotor, in which the hub is rocked about an axis which passed through the blades, requires an exceptionally small force to feather it, since the centrifugal force of the individual blades in their bearings is not involved because the two blades are turned as a unit, and the bearings for this rocking motion have only the torque and thrust force to act upon them, forces which are small compared to the centrifugal force.

Cut out for automatic control

Under certain circumstances it may be desired to eliminate the automatic control feature. Fig. 7 shows a device to accomplish this by locking the free action of the flywheel 70. Two arms 140, only one of which is shown, are secured to the cylinder 45 extending from it in a generally radially direction at 90° to one another, one preferably in a vertical and the other in a horizontal plane. At the outer end of the arms 140 a member 141 is hinged. A rod 142 is journalled in 141 and carries at one end a hand wheel 143 and is threaded on the other end. Upon these threads rides a clamping jaw 144, shaped to engage the flywheel case 73a. A spring 145 holds the assembly in engagement with the flywheel case 73a when it is desired to lock the operation of the automatic pilot, or holds the assembly out of the way when normal operation of the automatic pilot is desired. When the automatic action of the flywheel is prevented by bringing the jaws 144 down upon the flywheel case 73a, the pilot then controls the machine through the handwheels 143. This handwheel in the vertical plane supplies the longitudinal control, and the handwheel in the horizontal plane supplies the lateral control.

General stability

This feature of the invention, the use of a flywheel to maintain the orientation of aircraft in any direction desired by the operator is more fully described in an earlier application. However, in the present invention, the employment of this device raises some new problems not covered in the previous application. In take off and ascent the present aircraft functions as a helicopter and the stability occasioned by the tipping of the rotor in opposition to the mast is excellent. In a like manner descent as an Autogiro presents no difficulties since inclination of the mast causes a rotor inclination which tends to maintain the mast in a vertical position. Again in high forward speed stability is assured since the rotor will, as before, pull the mast into its proper position. The case of high speed flight with dead engine and propeller windmilling, or as in a dive with propeller overrunning the engine, is stable for a high pitch setting but unstable for a low pitch setting. This requires that the operator avoid lowered speed when flying forward with dead engine and bring the craft into the tail first position with auto rotation induced by air blowing backward, or upward, through the rotor. Should he fail to do this the pressure of the air on the windmilling forward propeller will invert the machine and turn it so that it is moving tail first, this will cause the direction of air through the rotor to reverse and stop the rotor unless the pitch is reduced to a low value. If this is done the air passing in a reverse direction through the upper, or forward, propeller will maintain it in auto rotation and the pilot may descend as before.

Although the principal feature of the invention is felt to be the method of control the novelty of the invention is not confined to this. That is to say, the novel method of control makes possible a radical departure in aircraft, and this radical departure in turn calls for reconsideration of a number of details of aircraft hitherto considered to be satisfactory and not to require further change. Such, for example, is cooling. The present aircraft requires a method of cooling independent of forward velocity, and in order to obtain this it departs from conventional practice. Again, the present aircraft demands for satisfactory operation a lighter and more vibration-free airscrew, and again departs from conventional practice to obtain it. Other departures such as the tilting seat, the semi-flexible blade attachment, etc., are made.

It will, however, be understood that these departures are not confined to the present convertible aircraft in their usefulness but would be of value in conventional types of aircraft now in use as explained above. However, it is felt that the proper place for their disclosure is in the body of the present application, for the departures mentioned are necessary or essential to the present convertible aircraft, while for conventional types of airplanes and helicopter they would be merely desirable as refinements.

I claim:

1. An aircraft comprising a fuselage, a wing, a source of power, a shaft extending in a direction generally chordwise of the wing, means coupling the shaft to the source of power, a propeller hub, means mounting the hub on said shaft, blades, means mounting the blades generally radially on said hub and for variation of their aerodynamic incidence, means for cyclically adjusting the aerodynamic incidence of said blades to cause the plane of rotation of said rotor to incline, rotating inertia means mounted in the aircraft, means interconnecting the means for cyclically adjusting the aerodynamic incidence of the blades of the propeller and the rotating inertia means to cause the plane of rotation of the propeller to be governed by the rotating inertia means.

2. An aircraft comprising a fuselage, a wing, a source of power, a shaft extending in a direction generally chordwise of the wing, means coupling the shaft to the source of power, a propeller hub, means mounting the hub on said shaft, blades, means mounting the blades generally radially on said hub and for variation of their aerodynamic incidence, means for cyclically adjusting the aerodynamic incidence of said blades to cause the plane of rotation of said rotor to incline, rotating inertia means mounted in the aircraft, means interconnecting the means for cyclically adjusting the aerodynamic incidence of the blades of the propeller and the rotating inertia means to cause the plane of rotation of the propeller to tend to approach parallelism with the plane of rotation of the rotating inertia means.

3. An aircraft comprising a fuselage, a wing, a source of power, a shaft extending in a direction generally chordwise of the wing, means coupling the shaft to the source of power, a propeller hub, means mounting the hub on said shaft, blades, means mounting the blades generally radially on said hub and for variation of their aerodynamic incidence, means for cyclically adjusting the aerodynamic incidence of said blades to cause the plane of rotation of said rotor to incline, rotating inertia means mounted in the aircraft, means interconnecting the means for cyclically adjusting the aerodynamic incidence of the blades of the propeller and the rotating inertia means to cause the plane of rotation of the propeller to be governed by the rotating inertia means, and pilot controlled means for varying the plane of rotation of the rotating inertia means.

4. An aircraft comprising a fuselage, a wing, a source of power, shafts extending in a direction generally chordwise of the wing and rotatable about a common axis, means coupling said shafts to the source of power for rotation in opposite directions, a propeller hub for each shaft, means mounting said hubs in axially spaced relation on the shafts, blades for each hub, means mounting the blades generally radially on said hubs and for variation of their aerodynamic incidence, means for simultaneously adjusting the incidence of all blades of each propeller, and means for cyclically adjusting the incidence of the blades of one of the propellers to incline the plane of rotation of said one propeller for control of the aircraft.

5. An aircraft comprising a fuselage, a wing, a source of power, shafts extending in a direction generally chordwise of the wing and rotatable about a common axis, means coupling said shafts to the source of power for rotation in opposite directions, a propeller hub for each shaft, means mounting said hubs in axially spaced relation on the shafts, blades for each hub, means mounting the blades generally radially on said hubs and for variation of their aerodynamic incidence, means for adjusting the incidence of the propeller blades, means interconnecting the incidence adjusting means of the blades of both propellers for simultaneously varying the incidence of all of the blades of one propeller in one sense and for simultaneously varying the incidence of all the blades of the other propeller in the opposite sense, and means for cyclically adjusting the incidence of the blades of one of the propellers to incline the plane of rotation of the said one propeller for control of the aircraft.

6. An aircraft comprising a fuselage, a wing, a source of power, shafts extending in a direction generally chordwise of the wing and rotatable about a common axis, means coupling said shafts to the source of power for rotation in opposite directions, a propeller hub for each shaft, means mounting said hubs in axially spaced relation on the shafts, blades for each hub, means mounting the blades generally radially on said hubs and for variation of their aerodynamic incidence, means for simultaneously adjusting the incidence of all blades of each propeller, means for cyclically adjusting the incidence of the blades of one of the propellers to incline the plane of rotation of the said one propeller for control of the aircraft, rotating inertia means carried by the aircraft and rotatable in a plane, and means interconnecting the rotating inertia means and the means for cyclically adjusting the incidence of the blades of the said one propeller to cause the plane of rotation thereof to be governed by the plane of rotation of the rotating inertia means.

7. An aircraft comprising a fuselage, a wing, a source of power, shafts extending in a direction generally chordwise of the wing and rotatable about a common axis, means coupling said shafts to the source of power for rotation in opposite directions, a propeller hub for each shaft, means mounting said hubs in axially spaced relation on the shafts, blades for each hub, means mounting the blades generally radially on said hubs and for variation of their aerodynamic incidence, means for simultaneously adjusting the incidence of all blades of each propeller, means for cyclically adjusting the incidence of the blades of one of the propellers to incline the plane of rotation of said one propeller for control of the aircraft, rotating inertia means carried by the aircraft and rotatable in a plane, and means interconnecting the rotating inertia means and the means for cyclically adjusting the incidence of the blades of the said one propeller to cause the plane of rotation thereof to be governed by the plane of rotation of the rotating inertia means, and pilot controlled means for adjusting the plane of rotation of the rotating inertia means.

8. An aircraft comprising a fuselage, a wing, a source of power, shafts extending in a direction generally chordwise of the wing and rotatable about a common axis, means coupling said shafts to the source of power for rotation in opposite directions, a propeller hub for each shaft, means mounting said hubs in axially spaced relation on the shafts, blades for each hub, means mounting the blades generally radially on said hubs and for variation of their aerodynamic incidence, means for adjusting the incidence of the propeller blades, means interconnecting the incidence adjusting means of the blades of both propellers for simultaneously varying the incidence of all of the blades of one propeller in one sense and for simultaneously varying the incidence of all the blades of the other propeller in the opposite sense, means for cyclically adjusting the incidence of the blades of one of the propellers to incline the plane of rotation of said one propeller for control of the aircraft, rotating inertia means carried by the aircraft and rotatable in a plane, and means interconnecting the rotating inertia means and the means for cyclically adjusting the incidence of the blades of the said one propeller to cause the plane of rotation thereof to be governed by the plane of rotation of the rotating inertia means.

9. An aircraft comprising a fuselage, a wing, a source of power, shafts extending in a direction generally chordwise of the wing and rotatable about a common axis, means coupling said shafts to the source of power for rotation in opposite directions, a propeller hub for each shaft, means mounting said hubs in axially spaced relation on the shafts, blades for each hub, means mounting the blades generally radially on said hubs and for variation of their aerodynamic incidence, means for adjusting the incidence of the propeller blades, means interconnecting the incidence adjusting means of the blades of both propellers for simultaneously varying the incidence of all of the blades of one propeller in one sense and for simultaneously varying the incidence of all the blades of the other propeller in the opposite sense, means for cyclically adjusting the incidence of the blades of one of the propellers to incline the plane of rotation of the said one propeller for control of the aircraft, and torque responsive means associated with the drive of said shafts for displacing said interconnecting means to effect incidence variation of the blades of said propellers in response to torque in the drive of said propellers.

10. An aircraft comprising a fuselage, a wing, a source of power, shafts extending in a direction generally chordwise of the wing and rotatable about a common axis, means coupling said shafts to the source of power for rotation in opposite directions, a propeller hub for each shaft, means mounting said hubs in axially spaced relation on the shafts, blades for each hub, means mounting the blades generally radially on said hubs and for variation of their aerodynamic incidence, means for adjusting the incidence of the propeller blades, means interconnecting the incidence adjusting means of the blades of both propellers for simultaneously varying the incidence of all of the blades of one propeller in one sense and for simultaneously varying the incidence of all the blades of the other propeller in the opposite sense whereby the incidence of the blades of the forward propeller can be shifted to a low position and the incidence of the blades of the aft propeller can be simultaneously shifted to high position for takeoff and landing in helicopter fashion, and whereby the incidence of the blades of both propellers can be substantially equalized for horizontal flight.

11. An aircraft comprising a fuselage, a wing, a source of power, shafts extending in a direction generally chordwise of the wing and rotatable about a common axis, means coupling said shafts to the source of power for rotation in opposite directions, a propeller hub for each shaft, means mounting said hubs in axially spaced relation on the shafts, blades for each hub, means mounting the blades generally radially on said hubs and for variation of their aerodynamic incidence, means for adjusting the incidence of the propeller blades, means interconnecting the incidence adjusting means of the blades of both propellers for simultaneously varying the incidence of all of the blades of one propeller in one sense and for simultaneously varying the incidence of all the blades of the other propeller in the opposite sense whereby the incidence of the blades of the forward propeller can be shifted to a low position and the incidence of the blades of the aft propeller can be simultaneously shifted to high position for takeoff and landing in helicopter fashion, and whereby the incidence of the blades of both propellers can be substantially equalized for horizontal flight, and means for cyclically adjusting the incidence of the blades of the forward propeller to incline the plane of rotation of the forward propeller for control of the aircraft.

12. An aircraft comprising a fuselage, a wing, a source of power, shafts extending in a direction generally chordwise of the wing and rotatable about a common axis, means coupling said shafts to the source of power for rotation in opposite directions, a propeller hub for each shaft, means mounting said hubs in axially spaced relation on the shafts, blades for each hub, means mounting the blades generally radially on said hubs and for variation of their aerodynamic incidence, means for adjusting the incidence of the propeller blades, means interconnecting the incidence adjusting means of the blades of both propellers for simultaneously varying the incidence of all of the blades of one propeller in one sense and for simultaneously varying the incidence of all the blades of the other propeller in the opposite sense whereby the incidence of the blades of the forward propeller can be shifted to a low position and the incidence of the blades of the aft propeller can be simultaneously shifted to high position for takeoff and landing in helicopter fashion, and whereby the incidence of the blades of both propellers can be substantially equalized for horizontal flight, means for cyclically adjusting the incidence of the blades of one of the propellers to incline the plane of rotation thereof for control of the aircraft, rotating inertia means carried by the aircraft and rotatable in a plane, and means interconnecting the rotating inertia means and the means for cyclically adjusting the incidence of the blades of the forward propeller to cause the plane of rotation of the said one propeller to be governed by the plane of rotation of the rotating inertia means.

13. An aircraft comprising a fuselage, a wing, a source of power, shafts extending in a direction generally chordwise of the wing and rotatable about a common axis, means coupling said shafts to the source of power for rotation in opposite directions, a propeller hub for each shaft, means mounting said hubs in axially spaced relation on the shafts, blades for each hub, means mounting the blades generally radially on said hubs and for variation of their aerodynamic incidence, means for adjusting the incidence of the propeller blades, means interconnecting the incidence adjusting means of the blades of both propellers for simultaneously varying the incidence of all of the blades of one propeller in one sense and for simultaneously varying the incidence of all the blades of the other propeller in the opposite sense whereby the incidence of the blades of the forward propeller can be shifted to a low position and the incidence of the blades of the aft propeller can be simultaneously shifted to high position for takeoff and landing in helicopter fashion, and whereby the incidence of the blades of both propellers can be substantially equalized for horizontal flight, and ailerons carried by said wing for controlling the aircraft about its longitudinal axis.

14. An aircraft comprising a fuselage, a wing, a source of power, shafts extending in a direction generally chordwise of the wing and rotatable about a common axis, differential means coupling said shafts to the source of power for rotation in opposite directions, a propeller hub for each shaft, means mounting said hubs in axially spaced relation on the shafts, blades for each hub, means mounting the blades generally radially on said hubs for variation of their aerodynamic incidence, means for simultaneously adjusting the incidence of all blades of one of the propellers, and means for cyclically adjusting the incidence of the blades of one of the propellers to incline the plane of rotation of said one propeller for control of the aircraft.

15. An aircraft comprising a fuselage, a wing, a source of power, shafts extending in a direction generally chordwise of the wing and rotatable about a common axis, differential means coupling said shafts to the source of power for rotation in opposite directions, a propeller hub for each shaft, means mounting said hubs in axially spaced relation on the shafts, blades for each hub, means mounting the blades generally radially on said hubs for variation of their aerodynamic incidence, means for adjusting the incidence of the propeller blades, means interconnecting the incidence adjusting means of the blades of both propellers for simultaneously varying the incidence of all of the blades of one propeller in one sense and for simultaneously varying the incidence of all the blades of the other propeller in the opposite sense whereby the incidence of the blades of the forward propeller can be shifted to a low position and the incidence of the blades of the aft propeller can be simultaneously shifted to high position for takeoff and landing in helicopter fashion, and whereby the incidence of the blades of both propellers and their rotational speeds can be substantially equalized for horizontal flight.

16. An aircraft comprising, in combination, a fuselage, a wing extending from said fuselage, engine means carried by said fuselage and including a drive shaft extending generally in the chordwise direction of said wing, a propeller comprising a hub mounted on said shaft and having blade means extending radially therefrom, said hub being mounted upon said shaft to be inclinable relative thereto, rotatable inertia means mounted upon said fuselage and universally inclinable relative thereto, and means interconnecting said rotary inertia means and said propeller and operably responsive to inclining movements of said rotary inertia means to actuate said propeller so as to transmit to the plane of rotation of said propeller the inclination of said inertia means or a part thereof.

17. An aircraft comprising in combination, a fuselage, a wing extending from said fuselage, a two-bladed airscrew, a power driven shaft extending from said fuselage generally in the chordwise direction of said wing, means mounting said airscrew upon said shaft to extend radially thereof and to be rotatable therewith and to permit said airscrew to rock about an axis extending longitudinally of the blades thereof, a rotating inertia means, means mounting said inertia means upon said fuselage for universal inclination relative to said fuselage, and means linking said inertia means to said airscrew for causing inclining movements of said inertia means to produce rocking movements of said airscrew whereby to cause the plane of rotation of said airscrew to incline similarly to inclining movements of said inertia means relative to said fuselage.

18. An aircraft comprising in combination, a fuselage, a wing extending from said fuselage, a two-bladed airscrew, a power driven shaft extending from said fuselage generally in the chordwise direction of said wing, means mounting said airscrew upon said shaft to extend radially thereof and to be rotatable therewith and to permit said airscrew to rock about an axis extending longitudinally of the blades thereof, a rotating inertia means, means mounting said inertia means upon said fuselage for universal inclination relative to said fuselage, and means linking said inertia means to said airscrew for causing inclining movements of said inertia means to produce rocking movements of said airscrew whereby to cause the plane of rotation of said airscrew to incline similarly to inclining movements of said inertia means relative to said fuselage, and pilot-controllable means for shifting said inertia means to variously adjusted inclined positions.

19. An aircraft comprising in combination, a fuselage, a wing extending from said fuselage, a shaft extending from said fuselage generally in the chordwise direction of said wing, an airscrew mounted upon said shaft to extend radially thereof and to rotate axially thereof for aircraft propulsion purposes, a second airscrew, means mounting said second airscrew upon said shaft to extend radially thereof and to be rotatable axially thereof and to permit said second airscrew to rock about an axis extending longitudinally of the blades thereof, engine means coupled to said first mentioned and said second mentioned airscrews for rotating them in opposite directions about said shaft, a rotating inertia means, means mounting said inertia means upon said fuselage for universal inclination relative to said fuselage, and means linking said inertia means to said second airscrew for causing inclining movements of said inertia means to produce rocking movements of said second airscrew whereby to cause the plane of rotation of said second airscrew to incline similarly to inclining movements of said inertia means relative to said fuselage, and pilot controllable means for forcing said inertia means to incline relative to said fuselage.

20. An aircraft comprising in combination, a fuselage, a shaft extending from said fuselage, an airscrew mounted upon said shaft to extend radially thereof and to rotate axially thereof for aircraft propulsion purposes, a second airscrew, means mounting said second airscrew upon said shaft to extend radially thereof and to be rotatable axially thereof and to permit said second airscrew to rock about an axis extending longitudinally of the blades thereof, engine means coupled to said first mentioned and said second mentioned airscrews for rotating them in opposite directions about said shaft, a rotating inertia means, means mounting said inertia means upon said fuselage for universal inclination relative to said fuselage, and means linking said inertia means to said second airscrew for causing inclining movements of said inertia means to produce rocking movements of said second airscrew whereby to cause the plane of rotation of said second airscrew to incline similarly to inclining movements of said inertia means relative to said fuselage, and pilot controllable means for forcing said inertia means to incline relative to said fuselage.

21. An aircraft comprising in combination, a fuselage, a wing extending from said fuselage, engine means carried by said fuselage and including a drive shaft extending from the fuselage generally in the chordwise direction of said wing, a propeller comprising a hub mounted on said shaft and having blade means extending radially therefrom, said hub being mounted upon said shaft to be inclinable relative thereto, rotatable inertia means mounted upon said fuselage and universally inclinable relative thereto, means interconnecting said rotary inertia means and said propeller and operably responsive to inclining movements of said rotary inertia means to actuate said propeller so as to transmit to said propeller the inclination of said inertia means or a part thereof, a second propeller mounted to rotate axially of said shaft, and engine means coupled to said first and second propellers to drive them to rotate simultaneously in directional opposition.

22. An aircraft comprising, in combination, a fuselage, engine means carried by said fuselage and including a drive shaft extending from the fuselage, a propeller comprising a hub mounted on said shaft and having blade means extending radially therefrom, said hub being mounted upon said shaft to be inclinable relative thereto, rotatable inertia means mounted upon said fuselage and universally inclinable relative thereto, means interconnecting said rotary inertia means and said propeller and operably responsive to inclining movements of said rotary inertia means to actuate said propeller so as to transmit to said propeller the inclination of said inertia means or a part thereof, a second propeller mounted to rotate axially of said shaft, and engine means coupled to said first and second propellers to drive them to rotate simultaneously in directional opposition.

ARTHUR MIDDLETON YOUNG.